United States Patent
Park

(10) Patent No.: US 9,030,068 B2
(45) Date of Patent: May 12, 2015

(54) SPINDLE MOTOR AND METHOD OF MANUFACTURING THE SAME

(75) Inventor: Young Ha Park, Gyunggi-do (KR)

(73) Assignee: Samsung Electro-Mechanics Co., Ltd., Suwon-Si (KR)

( * ) Notice: Subject to any disclaimer, the term of this patent is extended or adjusted under 35 U.S.C. 154(b) by 259 days.

(21) Appl. No.: 13/603,684

(22) Filed: Sep. 5, 2012

(65) Prior Publication Data

US 2013/0134812 A1 May 30, 2013

(30) Foreign Application Priority Data

Nov. 28, 2011 (KR) .................. 10-2011-0124986

(51) Int. Cl.
*H02K 5/167* (2006.01)
*H02K 7/08* (2006.01)
*H02K 15/16* (2006.01)

(52) U.S. Cl.
CPC .............. *H02K 5/1677* (2013.01); *H02K 15/16* (2013.01); *H02K 5/1672* (2013.01); *H02K 7/086* (2013.01)

(58) Field of Classification Search
CPC .... H02K 5/1677; H02K 5/165; H02K 5/1672
USPC ...... 310/90, 91, 40 MM, 67 R; 384/100, 107, 384/113, 114, 119; 29/596, 898.04, 898.07, 29/898.1
See application file for complete search history.

(56) References Cited

U.S. PATENT DOCUMENTS

| | | | |
|---|---|---|---|
| 6,493,181 B1 * | 12/2002 | Ichiyama | 360/99.08 |
| 7,056,024 B2 * | 6/2006 | Weingord et al. | 384/100 |
| 2003/0039416 A1 | 2/2003 | Hino | |
| 2006/0147135 A1 * | 7/2006 | Kim | 384/107 |
| 2008/0273822 A1 * | 11/2008 | Le et al. | 384/107 |
| 2010/0142869 A1 * | 6/2010 | Grantz et al. | 384/119 |

FOREIGN PATENT DOCUMENTS

| | | |
|---|---|---|
| JP | 2001-234926 | 8/2001 |
| KR | 10-2006-0079630 | 7/2006 |
| KR | 10-2011-0008843 | 1/2011 |

* cited by examiner

*Primary Examiner* — Quyen Leung
*Assistant Examiner* — Robert E Mates

(57) ABSTRACT

There is provided a spindle motor including: a shaft connected directly or indirectly to a base member and having a depression groove formed in a central portion of an outer peripheral surface thereof; a sleeve rotatably installed on the shaft and having a communication hole formed so as to be connected to the depression groove; and a rotor hub fixedly installed on the sleeve to thereby rotate together therewith, wherein the communication hole is inclined so that lubricating fluid may be easily injected into the depression groove, and the sleeve has a fluid storage part formed on an outer peripheral surface thereof, the fluid storage part being connected to the communication hole and temporarily storing the lubricating fluid therein.

5 Claims, 7 Drawing Sheets

SPINDLE MOTOR AND METHOD OF MANUFACTURING THE SAME

CROSS-REFERENCE TO RELATED APPLICATIONS

This application claims the priority of Korean Patent Application No. 10-2011-0124986 filed on Nov. 28, 2011, in the Korean Intellectual Property Office, the disclosure of which is incorporated herein by reference.

BACKGROUND OF THE INVENTION

1. Field of the Invention

The present invention relates to a spindle motor and a method of manufacturing the same.

2. Description of the Related Art

A shaft fixing type spindle motor in which a shaft having strong impact resistance is fixed to a case of a hard disk driving device is generally mounted in an information recording and reproducing device such as a hard disk driving device for a server.

That is, the shaft is fixedly installed in the spindle motor mounted in the hard disk driving device for a server in order to prevent information recorded in the server from being damaged and being unreproducible or unreadable due to external impacts.

Meanwhile, since a spindle motor used for an enterprise hard disk driving device is required to have high reliability, it is necessary to maintain an originally provided amount of lubricating fluid filling a fluid dynamic bearing assembly including a fixed-type shaft.

That is, a lubricating fluid sealing technology capable of suppressing a reduction in the amount of lubricating fluid filling a spindle motor, due to evaporation, has been urgently demanded.

Further, the development of a structure in which a lubricating fluid filling operation may be smoothly undertaken has been demanded, together with the development of the sealing technology.

SUMMARY OF THE INVENTION

An aspect of the present invention provides a spindle motor filled with a fixed quantity of lubricating fluid.

Another aspect of the present invention provides a spindle motor in which a lubricating fluid filling operation may be easily undertaken, and a method of manufacturing the same.

According to an aspect of the present invention, there is provided a spindle motor including: a shaft fixedly connected directly or indirectly to a base member and having a depression groove formed in a central portion of an outer peripheral surface thereof; a sleeve rotatably installed on the shaft and having a communication hole formed so as to be connected to the depression groove; and a rotor hub fixedly installed on the sleeve to thereby rotate together therewith, wherein the communication hole is inclined so that a lubricating fluid may be easily injected into the depression groove, and the sleeve has a fluid storage part formed on an outer peripheral surface thereof, the fluid storage part being connected to the communication hole and temporarily storing the lubricating fluid therein.

The fluid storage part may be formed on the outer peripheral surface of the sleeve in a circumferential direction.

The spindle motor may further include: a lower thrust member installed on the base member and mounted on a lower end portion of the shaft; and an upper thrust member fixedly installed on an upper end portion of the shaft.

In spaces formed by the depression groove and an inner peripheral surface of the sleeve, first and second liquid-vapor interfaces may be formed by the lubricating fluid separately filling upper and lower portions thereof and air.

The sleeve may have an inclination part tapered in a downward axial direction so as to form a liquid-vapor interface together with the upper thrust member, wherein the inclination part has an outer diameter larger in an upper portion thereof than that in a lower portion thereof.

The rotor hub may include: a rotor hub body including an insertion part formed therein, the insertion part having the upper thrust member insertedly disposed in an inner portion thereof; a mounting part extended from an edge of the rotor hub body and having a driving magnet mounted on an inner surface thereof; and a disk seating part extended from an edge of the mounting part in an outer diameter direction.

The shaft and the sleeve may be disposed to be spaced apart from each other by a predetermined interval to thereby form a bearing clearance, wherein the bearing clearance includes an upper bearing clearance and a lower bearing clearance, based on the depression groove.

According to another aspect of the present invention, there is provided a method of manufacturing a spindle motor, the method including: connecting a sleeve and upper and lower thrust members to a shaft and then fixedly installing a rotor hub on the sleeve; disposing the connected upper and lower thrust member, sleeve, rotor hub, and shaft in a state in which they are inverted; and injecting a lubricating fluid into a fluid storage part formed on the sleeve.

The method may further include, after the injecting of the lubricating fluid into the fluid storage part formed on the sleeve, drawing the lubricating fluid fully filling a space formed by a depression groove and the sleeve, through a communication hole formed in the sleeve, to the exterior thereof.

The communication hole may be inclined from a lower portion thereof toward an upper portion thereof in an axial direction so that a filled amount of the lubricating fluid is confirmed.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE INVENTION

Embodiments of the present invention will now be described in detail with reference to the accompanying drawings. However, it should be noted that the spirit of the present invention is not limited to the embodiments set forth herein and those skilled in the art and understanding the present invention can easily accomplish retrogressive inventions or other embodiments included in the spirit of the present invention by the addition, modification, and removal of components within the same spirit, but those are construed as being included in the spirit of the present invention.

Further, when it is determined that the detailed description of the known art related to the present invention may obscure the gist of the present invention, the detailed description thereof will be omitted.

Figure 1:
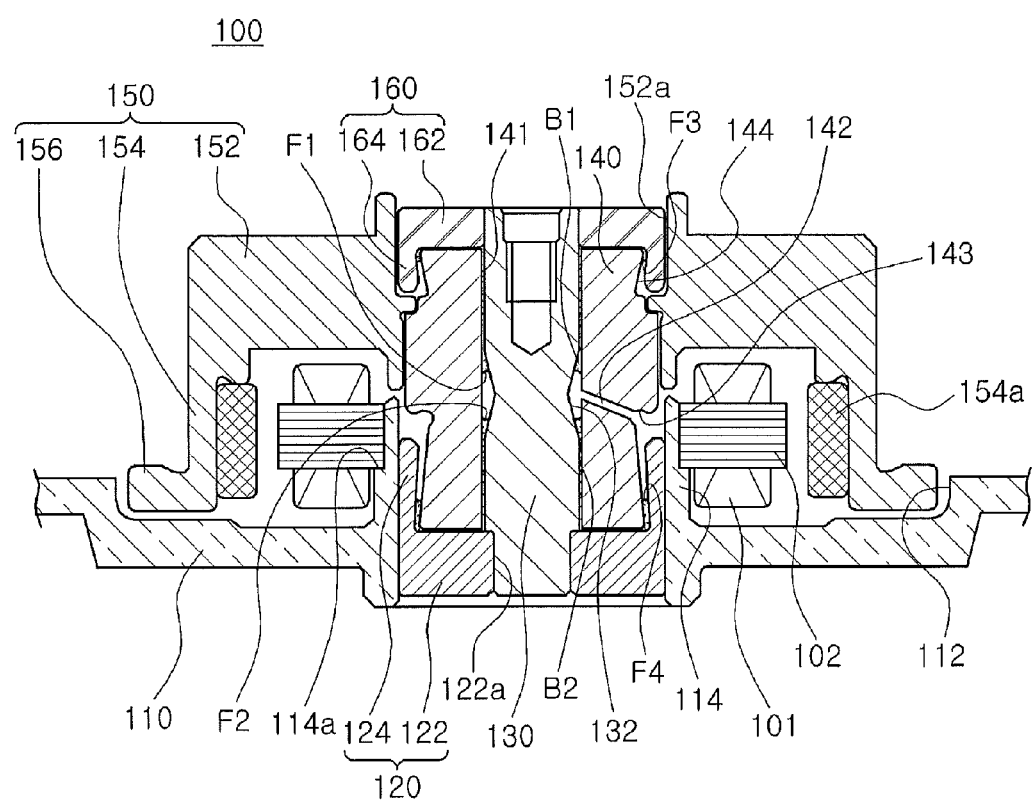
FIG. 1 is a schematic cross-sectional view showing a spindle motor according to an embodiment of the present invention.
Figure 2:
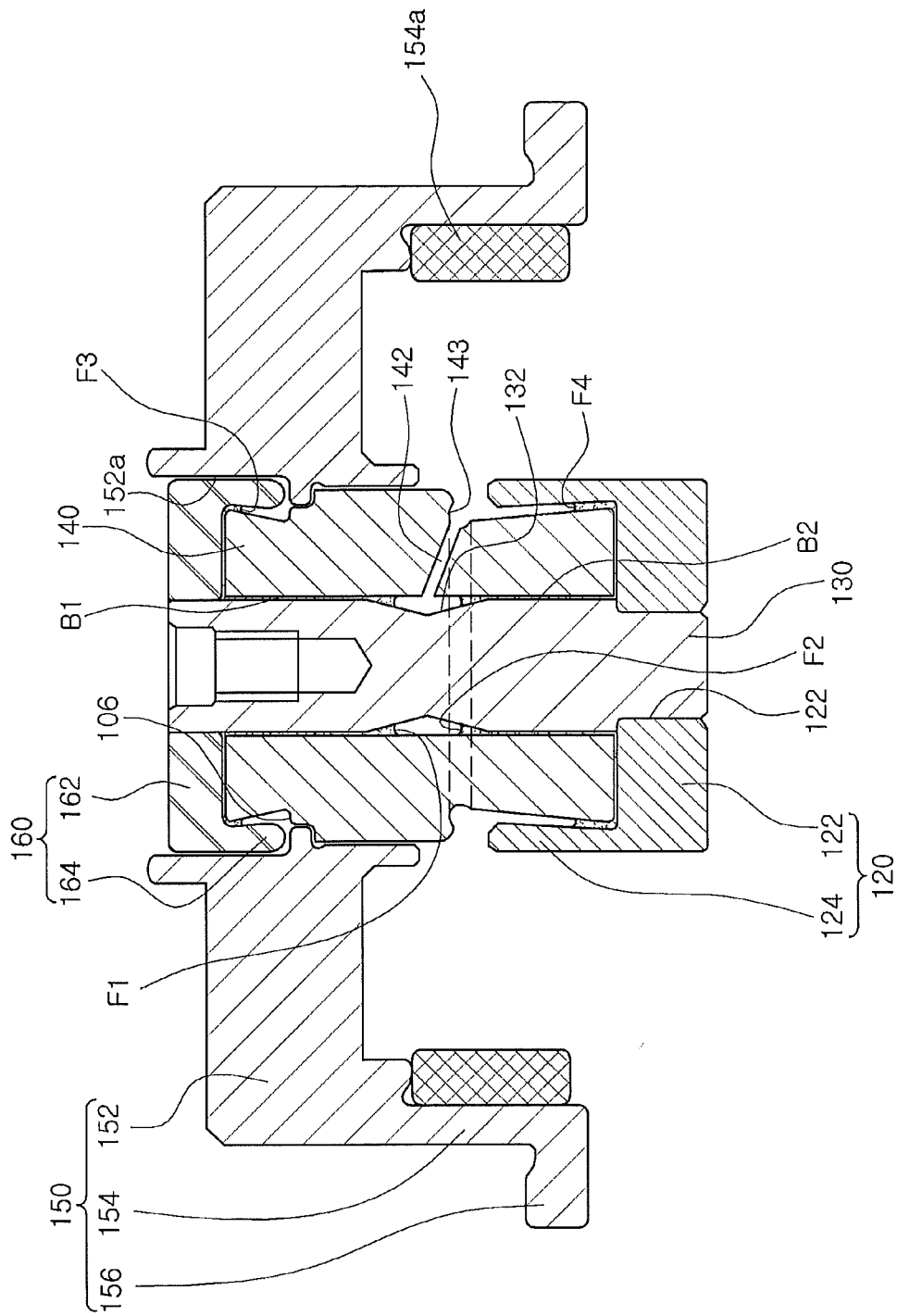
FIG. 2 is an enlarged cross-sectional view showing a shaft, a sleeve, upper and lower thrust members, and a rotor hub included in the spindle motor according to the embodiment of the present invention.

FIG. 1 is a schematic cross-sectional view showing a spindle motor according to an embodiment of the present invention; FIG. 2 is an enlarged cross-sectional view showing a shaft, a sleeve, upper and lower thrust members, and a rotor hub included in the spindle motor according to the embodiment of the present invention; and FIG. 3 is a perspective view showing the sleeve included in the spindle motor according to the embodiment of the present invention.

Figure 3:
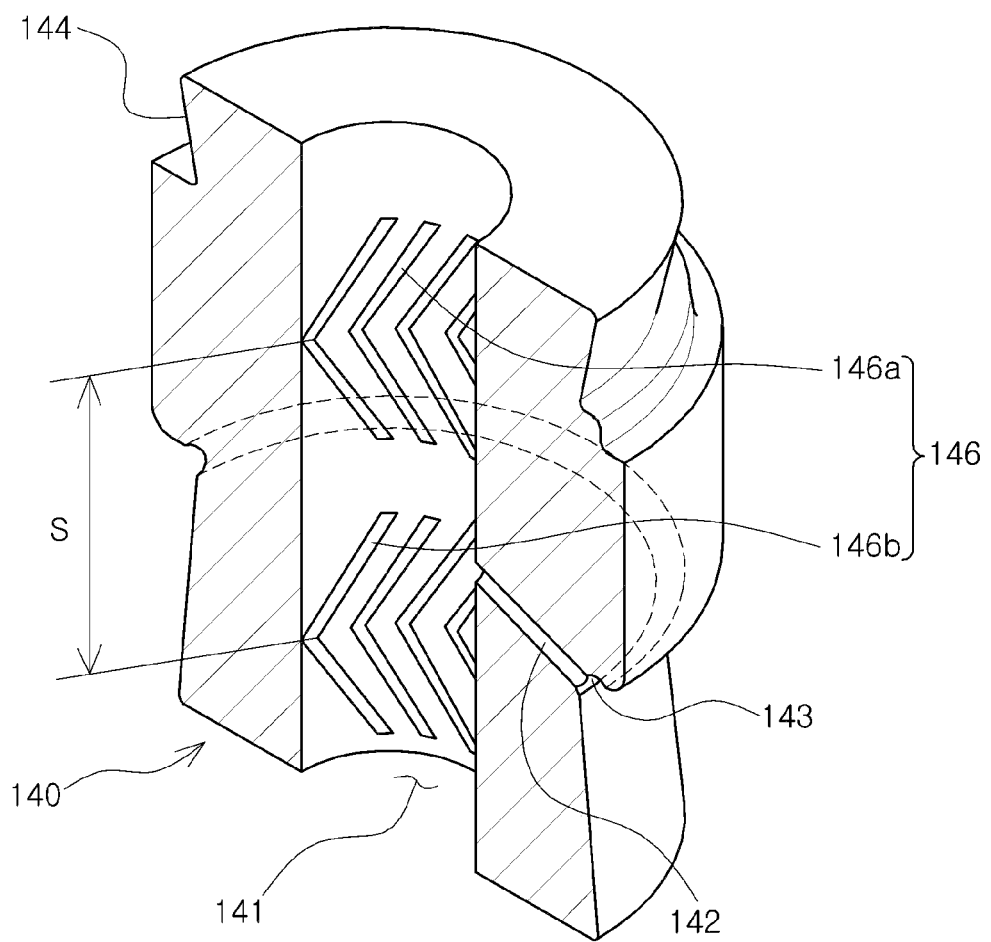
FIG. 3 is a perspective view showing the sleeve included in the spindle motor according to the embodiment of the present invention.

Referring to FIGS. 1 through 3, the spindle motor 100 according to the embodiment of the present invention may include a base member 110, a lower thrust member 120, a shaft 130, a sleeve 140, a rotor hub 150, and an upper thrust member 160 by way of example.

The base member 110 may include a mounting groove 112 so as to form a predetermined space with the rotor hub 150. In addition, the base member 110 may include a coupling part 114 extended upwardly in an axial direction and having a stator core 102 installed on an outer peripheral surface thereof.

In addition, the coupling part 114 may include a seat surface 114a provided on the outer peripheral surface thereof so that the stator core 102 may be seated and installed thereon. Further, the stator core 102 seated on the coupling part 114 may be disposed over the mounting groove 112 of the base member 110 described above.

The lower thrust member 120 may be fixedly installed on the base member 110. That is, the lower thrust member 120 may be insertedly installed in the coupling part 114. More specifically, the lower thrust member 120 may be installed so that an outer peripheral surface thereof is bonded to an inner peripheral surface of the coupling part 114.

Meanwhile, the lower thrust member 120 may include a disk part 122 having an inner surface fixedly installed on the shaft 130 and an outer surface fixedly installed on the base member 110 and an extension part 124 extended upwardly from the disk part 122 in an axial direction.

That is, the lower thrust member 120 may have a cup shape having a hollow part and may have a 'L' shaped cross section.

In addition, the disk part 122 may be provided with an installation hole 122a for installing the shaft 130, and the shaft 130 may be insertedly mounted in the installation hole 122a.

Here, terms with respect to directions will be defined. As viewed in FIG. 1, an axial direction refers to a vertical direction, that is, a direction from a lower portion of the shaft 130 toward an upper portion thereof or a direction from the upper portion of the shaft 130 toward the lower portion thereof, a radial direction refers to a horizontal direction, that is, a direction from the shaft 130 toward an outer peripheral surface of the rotor hub 150 or from the outer peripheral surface of the rotor hub 150 toward the shaft 130, and a circumferential direction refers to a rotation direction along the outer peripheral surface of the rotor hub 150.

In addition, the lower thrust member 120 may be included, together with the base member 110, in a fixed member, that is, a stator.

Meanwhile, the outer surface of the lower thrust member 120 may be bonded to an inner surface of the base member 110 by an adhesive and/or welding. In other words, the outer surface of the lower thrust member 120 may be fixedly bonded to an inner surface of the coupling part 114 of the base member 110.

In addition, a thrust dynamic groove (not shown) for generating thrust fluid dynamic pressure may be formed in at least one of an upper surface of the lower thrust member 120 and a lower surface of the sleeve 140.

Further, the lower thrust member 120 may also serve as a sealing member for preventing lubricating fluid from being leaked.

The shaft 130 may be connected directly or indirectly to the base member 110 and have a depression groove 132 formed in a central portion of an outer peripheral surface thereof. That is, the shaft 130 may be fixedly connected indirectly to the base member 110 through the lower thrust member 120. That is, the shaft 130 may be installed so that a lower end portion thereof is inserted into the installation hole 122a formed in the disk part 122 of the lower thrust member 120.

In addition, the lower end portion of the shaft 130 may be bonded to an inner surface of the disk part 122 by an adhesive and/or welding. Therefore, the shaft 130 may be fixed.

Further, although the present embodiment describes a case in which the shaft 130 is fixedly installed on the lower thrust member 120, the present invention is not limited thereto. That is, the shaft 130 may also be fixedly installed on the base member 110.

Meanwhile, the shaft 130 may be also included, together with the lower thrust member 120 and the base member 110, in the fixed member, that is, the stator.

In addition, the depression groove 132 may be formed to be depressed from an outer peripheral surface of the shaft to thereby serve to separate a lubricating fluid filling bearing clearances B1 and B2 into two parts. In addition, the depression groove 132 may have a 'V' shaped cross section.

Further, the depression groove 132 may serve to form a liquid-vapor interface (that is, an interface between the lubricating fluid and air) together with an inner surface of the sleeve 140.

A detailed description thereof will be provided below.

The sleeve 140 may be rotatably installed on the shaft 130. To this end, the sleeve 140 may include a through hole 141 into which the shaft 130 is inserted. Meanwhile, in a case in which the sleeve 140 is installed on the shaft 130, an inner peripheral surface of the sleeve 140 and the outer peripheral surface of the shaft 130 may be disposed to be spaced apart from each other by a predetermined interval to thereby form the bearing clearance B1 and B2 therebetween.

In addition, these bearing clearances B1 and B2 are filled with the lubricating fluid.

Here, describing the bearing clearances B1 and B2 in more detail, the bearing clearances B1 and B2 may be configured to include an upper bearing clearance B1 and a lower bearing clearance B2. In addition, the upper bearing clearance B1 indicates a space formed by an upper end portion of the shaft 130 and an upper end portion of the sleeve 140 and a space formed by the upper end portion of the sleeve 140 and the upper thrust member 160.

Further, the lower bearing clearance B2 indicates a space formed by a lower end portion of the shaft 130 and a lower end portion of the sleeve 140 and a space formed by the lower end portion of the sleeve 140 and the lower thrust member 120.

Meanwhile, here, describing the depression groove 132 formed in the shaft 130, the depression groove 132 may serve to form an interface between the lubricating fluid filling each of the above-mentioned bearing clearances B1 and B2, that is, the upper bearing clearance B1 and the lower bearing clearance B2, and air.

That is, an interface between the lubricating fluid filling the upper bearing clearance B1 and the air, that is, a first liquid-vapor interface F1 may be formed at an upper portion of the depression groove 132. In addition, an interface between the lubricating fluid filling the lower bearing clearance B2 and the air, that is, a second liquid-vapor interface F2 may be formed at a lower portion of the depression groove 132.

The depression groove 132 may have a 'V' shape so that the first and second liquid-vapor interfaces F1 and F2 may be formed as described above. That is, the depression groove 132 may have the 'V' shape so that the first and second liquid-vapor interfaces F1 and F2 may be formed by a capillary phenomenon.

In addition, the sleeve 140 may include a communication hole 142 disposed to face the depression groove 132 to thereby allow the depression groove 132 and the outside of the sleeve 140 to be in communication with each other. That is, the communication hole 142 for allowing pressure of the depression groove 132 to be the same as that of the outside of the sleeve 140 may be formed in the sleeve 140 so that the first and second liquid-vapor interfaces F1 and F2 as described above may be formed.

In addition, the communication hole 142 may be inclined upwardly from an outer peripheral surface of the sleeve 140 toward an inner peripheral surface thereof. That is, the communication hole 142, a space formed by the depression groove 132 and the inner peripheral surface of the sleeve, may be inclined upwardly so that the lubricating fluid may be relatively more easily introduced thereinto.

In addition, the sleeve 140 may include a fluid storage part 143 formed on the outer peripheral surface thereof, wherein the fluid storage part 143 is connected to the communication hole 142 and temporarily stores the lubricating fluid therein. In addition, the fluid storage part 143 may be formed in the outer peripheral surface of the sleeve 140 in a circumferential direction thereof. Meanwhile, the fluid storage part 143 may be formed of a groove.

As described above, since the fluid storage part 143 is formed on the outer peripheral surface of the sleeve 140, an operator may inject the lubricating fluid while observing a state in which the lubricating fluid is injected at the time of injection of the lubricating fluid.

The detailed description thereof will be provided below.

In addition, in a case in which a lubricating fluid exceeding a fixed quantity is injected after the injection of the lubricating fluid is completed, the operator may perform an operation of discharging the lubricating fluid from the bearing clearance by drawing the excessively injected lubricating fluid through the communication hole 142.

Therefore, a fixed quantity of lubricating fluid may be injected.

Meanwhile, the sleeve 140 may have an inclination part 144 tapered in a downward axial direction so as to form a liquid-vapor interface together with the upper thrust member 160, wherein the inclination part 144 has an outer diameter larger in an upper portion thereof than that in a lower portion thereof.

In other words, the inclination part 144 having an outer diameter larger in the upper portion thereof than that in the lower portion thereof may be formed at the upper end portion of the sleeve 140 so that a third liquid-vapor interface F3 may be formed in a space between an outer peripheral surface of the sleeve 140 and an inner peripheral surface of the upper thrust member 160.

Therefore, the lubricating fluid filling the upper bearing clearance B1 may form the first and third liquid-vapor interfaces F1 and F3.

In addition, the sleeve 140 includes the rotor hub 150 bonded to an upper end portion of the outer peripheral surface thereof.

Meanwhile, a lower end portion of the outer peripheral surface of the sleeve 140 may be inclined upwardly in an inner diameter direction so as to form a liquid-vapor interface together with the extension part 124 of the lower thrust member 120.

That is, the lower end portion of the sleeve 140 may be inclined upwardly in the inner diameter direction so that a fourth liquid-vapor interface F4 may be formed in a space between the outer peripheral surface of the sleeve 140 and the extension part 124 of the lower thrust member 120.

As described above, since the fourth liquid-vapor interface F4 is formed in the space between the lower end portion of the sleeve 140 and the extension part 124, the lubricating fluid filling the lower bearing clearance B2 forms the second and fourth liquid-vapor interfaces F2 and F4.

In addition, the sleeve 140 may include a dynamic groove 146 (See FIG. 3) formed in the inner surface thereof, wherein the dynamic groove 146 generates fluid dynamic pressure through the lubricating fluid filling the bearing clearances B1 and B2 at the time of rotation of the sleeve 140. That is, the dynamic groove 146 may include upper and lower dynamic grooves 146a and 146b.

However, the dynamic groove 146 is not limited to being formed in the inner surface of the sleeve 140 but may also be formed in the outer peripheral surface of the shaft 130.

The rotor hub 150 may be coupled to the sleeve 140 to thereby rotate together with the sleeve 140.

The rotor hub 150 may include a rotor hub body 152 including an insertion part 152a formed therein, the insertion part 152a having the upper thrust member 160 insertedly disposed in an inner portion thereof, a magnet mounting part 154 extended from an edge of the rotor hub body 152 and having a driving magnet 154a mounted on an inner surface thereof, and a disk seating part 156 extended from an edge of the magnet mounting part 154 in an outer diameter direction.

Meanwhile, a lower end portion of an inner surface of the rotor hub body 152 may be bonded to an outer surface of the sleeve 140. That is, the lower end portion of the inner surface of the rotor hub body 152 may be bonded to an outer peripheral surface of the sleeve 140 by an adhesive and/or welding.

Therefore, the sleeve 140 may rotate together with the rotor hub 150 at the time of rotation of the rotor hub 150.

In addition, the magnet mounting part 154 may be extended downwardly from the rotor hub body 152 in the axial direction. In addition, the magnet mounting part 154 may include a driving magnet 1154a fixedly installed on an inner surface thereof.

The driving magnet 154a may have an annular ring shape and be a permanent magnet generating a magnetic field having predetermined strength by alternately magnetizing an N pole and an S pole in the circumferential direction.

Meanwhile, the driving magnet 154a may be disposed to face a front end of the stator core 102 having a coil 101 wound therearound and generate driving force by electromagnetic interaction with the stator core 102 having the coil 101 wound therearound so that the rotor hub 150 may rotate.

That is, when power is supplied to the coil 101, the driving force rotating the rotor hub 150 may be generated by the electromagnetic interaction between the stator core 102 having the coil 101 wound therearound and the driving magnet 154a disposed to face the stator core 102, such that the rotor hub 150 may rotate together with the sleeve 140.

The upper thrust member 160 may be fixedly installed on the upper end portion of the shaft 130 and form the liquid-vapor interface together with the sleeve 140.

Meanwhile, the upper thrust member 160 may include a body 162 having an inner surface bonded to the shaft 130 and a protrusion part 164 extended from the body 162 to thereby form the liquid-vapor interface together with the inclination part 144.

The protrusion part 164 may be extended downwardly from the body 162 in the axial direction and have an inner surface disposed to face the inclination part 144.

In addition, the protrusion part 164 may be extended from the body 162 so as to be in parallel with the shaft 130.

Further, the upper thrust member 160 may be inserted and disposed in a space formed by the upper end portion of the outer peripheral surface of the shaft 130, the outer surface of the sleeve 140, and the inner surface of the rotor hub 150.

In addition, the upper thrust member 160, which also is a fixed member fixedly installed together with the base member 110, the lower thrust member 120, and the shaft 130, may be a member configuring the stator.

Meanwhile, since the upper thrust member 160 is fixedly installed on the shaft 130 and the sleeve 140 rotates together with the rotor hub 150, when the sleeve 140 rotates, the third liquid-vapor interface F3 formed in the space between the inclination part 144 of the sleeve 140 and the protrusion part 164 may be inclined toward the inclination part 144 of the sleeve 140 by the rotation of the sleeve 140.

Therefore, scattering of the lubricating fluid by centrifugal force may be reduced.

In addition, a sealing space 106 may be formed by the inclination part 144 of the sleeve 140, and an inner surface of the rotor hub 150, and the third liquid-vapor interface F3 may be formed in the space between the upper thrust member 160 and the inclination part 144 of the sleeve 140.

Therefore, when impact is applied from the outside, a phenomenon in which the lubricating fluid leaking from the third liquid-vapor interface F3 is scattered to the outside may be reduced.

In addition, an outer peripheral surface of the upper thrust member 160 and the inner surface of the rotor hub 150 disposed to face the outer peripheral surface of the upper thrust member 160 may form a labyrinth seal. That is, an outer surface of the upper thrust member 160 and the inner surface of the rotor hub body 152 may be disposed to be spaced apart from each other by a predetermined interval and form the labyrinth seal so as to suppress flow of air containing evaporated lubricating fluid to the outside.

Therefore, the flow of the air containing the evaporated lubricating fluid to the outside may be suppressed, whereby reduction in the lubricating fluid may be suppressed.

Meanwhile, a thrust dynamic pressure groove (not shown) for generating thrust dynamic pressure may be formed in at least one of a lower surface of the upper thrust member 160 and the upper surface of the sleeve 140 disposed to face the lower surface of the upper thrust member 160.

In addition, the upper thrust member 160 may also serve as a sealing member preventing the lubricating fluid filling the upper bearing clearance B1 from being leaked upwardly.

As described above, at the time of the injection of the lubricating fluid, the lubricating fluid may be temporally stored in the fluid storage part 143 formed in the outer surface of the sleeve 140 and then introduced into the communication hole 142. Therefore, since the operator may perform a process of injecting a lubricating fluid while confirming the process with the naked eye, a fixed quantity of lubricating fluid may be injected.

In addition, since the process of injecting a lubricating fluid may be performed through the fluid storage part 143 and the communication hole 142, the process of injecting a lubricating fluid may be relatively more easily performed.

In addition, the clearance between the upper thrust member 160 and the rotor hub 150 may be formed to have a relatively narrow space to suppress the flow of the air containing the evaporated lubricating fluid to the outside, whereby the reduction in the lubricating fluid filling the upper bearing clearance B1 may be suppressed.

In addition, the spindle motor 100 according to the embodiment of the present invention needs not include a separate sealing member for preventing leakage of the lubricating fluid, such that a bearing span length may increase. Therefore, rotational characteristics may be improved.

Here, the bearing span length S (See FIG. 3) indicates a distance between an area in which relatively maximum dynamic pressure is generated when the lubricating fluid is pumped by an upper dynamic groove 146a and an area in which relatively maximum dynamic pressure is generated when the lubricating fluid is pumped by a lower dynamic groove 146b.

Meanwhile, in a rotating member (that is, the sleeve), and a fixed member (that is, the upper and lower thrust members), which form the liquid-vapor interfaces, that is, the third and fourth liquid-vapor interfaces F3 and F4; the sleeve 140, a rotating member, may be disposed at an inner side of the fixed member in the radial direction, whereby scattering of the lubricating fluid by centrifugal force may be reduced.

Hereinafter, a method of manufacturing a spindle motor according to an embodiment of the present invention will be described with reference to the accompanying drawings. However, the same reference numerals will be used to describe the same components as the above-mentioned components.

FIGS. 4 through 7 are views showing a method of manufacturing a spindle motor according to the embodiment of the present invention.

Figure 4:
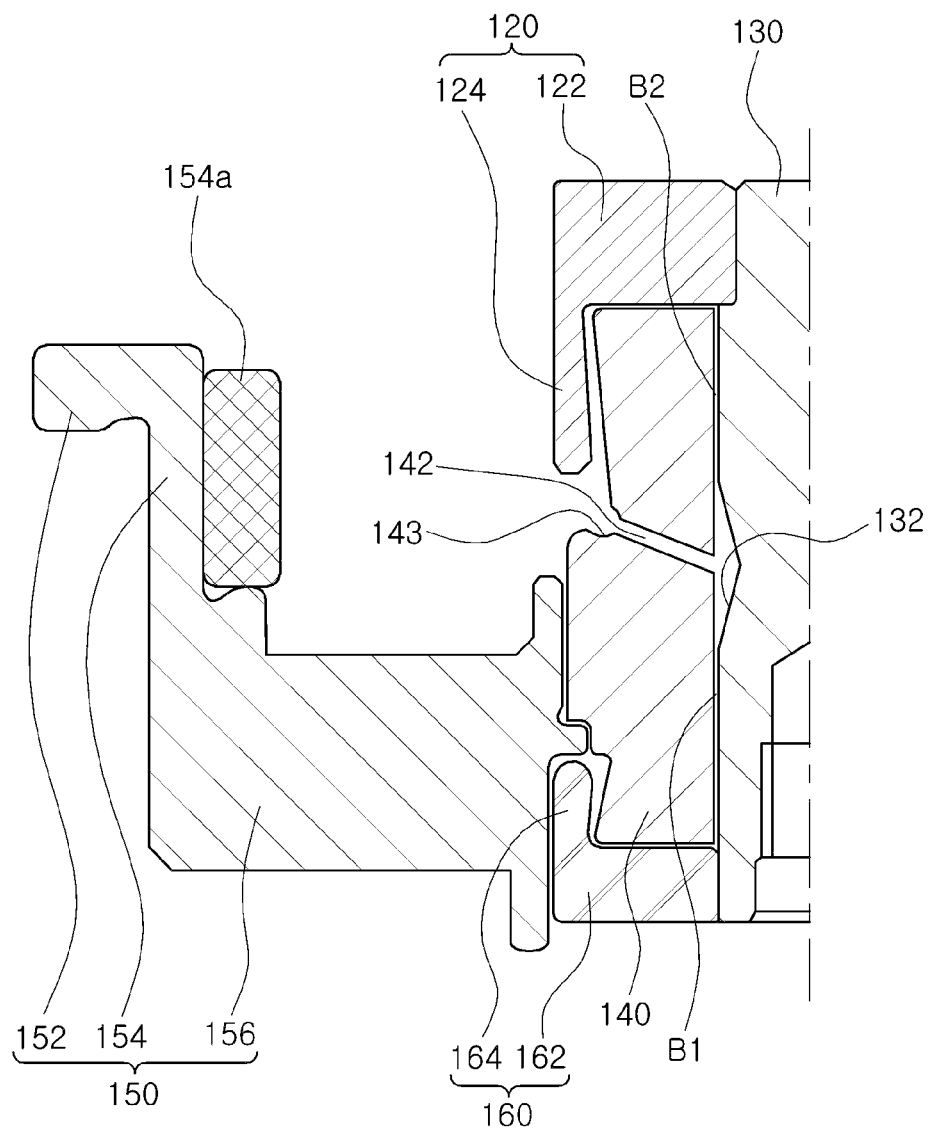
FIGS. 4 through 7 are views describing a method of manufacturing a spindle motor according to the embodiment of the present invention.

First, referring to FIG. 4, the lower thrust member 120 may be fixedly installed on the shaft 130 and the sleeve 140 may be then installed on the shaft 130. Then, the upper thrust member 160 may be installed on the shaft 130.

Next, the rotor hub 150 may be fixedly installed on the outer peripheral surface of the sleeve 140.

Meanwhile, the sleeve 140 may also be installed on the shaft 130 after the rotor hub 150 is fixedly installed on the outer peripheral surface of the sleeve 140.

Thereafter, as shown in FIG. 4, the components connected as described above, that is, the upper and lower thrust members 160 and 120, the sleeve 140, the rotor hub 150, and the shaft 130 may be prepared in a state in which they are inverted.

Figure 5:
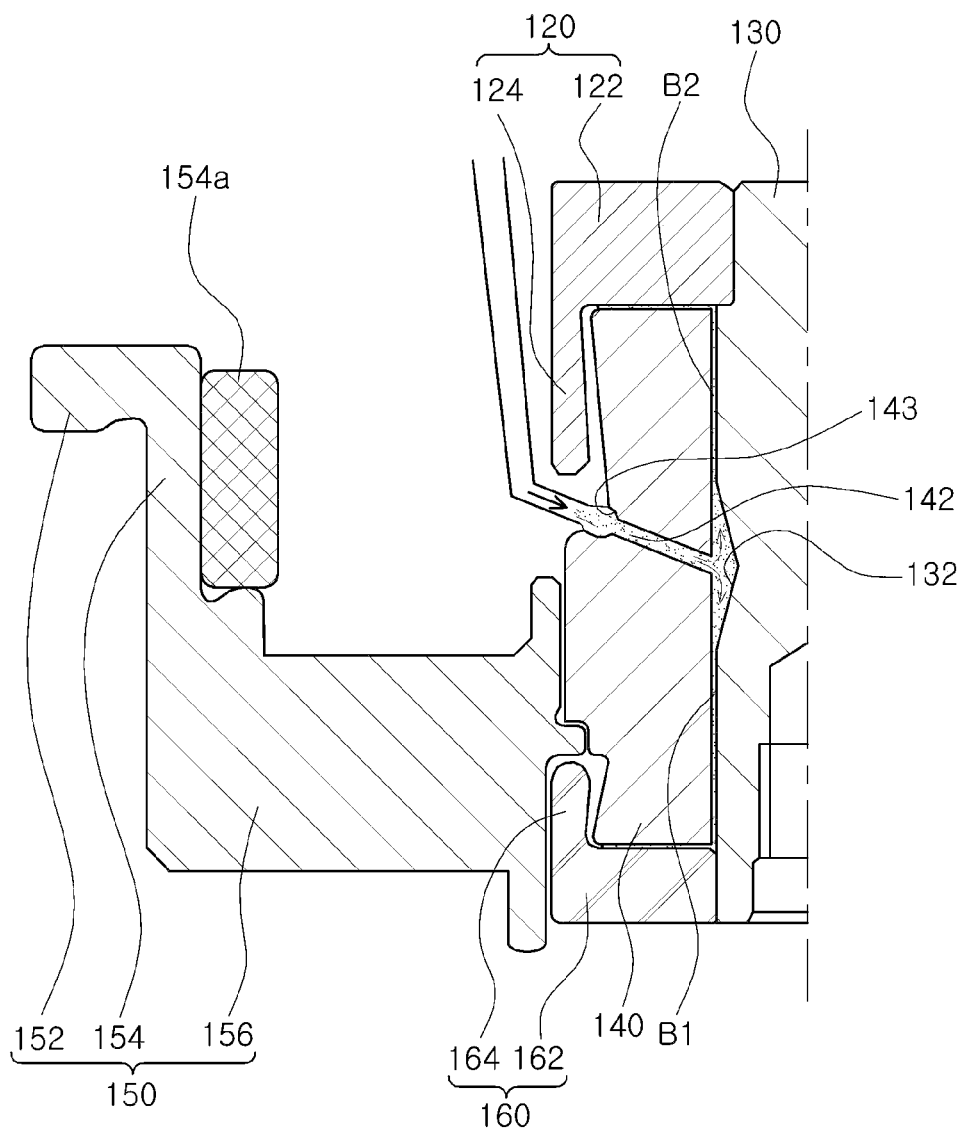

Next, as shown in FIG. 5, the lubricating fluid may be injected into the fluid storage part 143 of the sleeve 140. When the lubricating fluid is injected to the fluid storage part 143 as described above, the lubricating fluid temporally stored in the fluid storage part 143 may be introduced into the space formed by the depression groove 132 of the shaft 130 and the sleeve 140 through the communication hole 142.

In addition, the communication hole 142 may be inclined from a lower portion thereof toward an upper portion thereof in the axial direction so that a filled amount of the lubricating fluid may be confirmed.

When the lubricating fluid is injected as described above, the lubricating fluid may be injected into the bearing clearances B1 and B2 formed by the sleeve 140 and the shaft 130.

Figure 6:
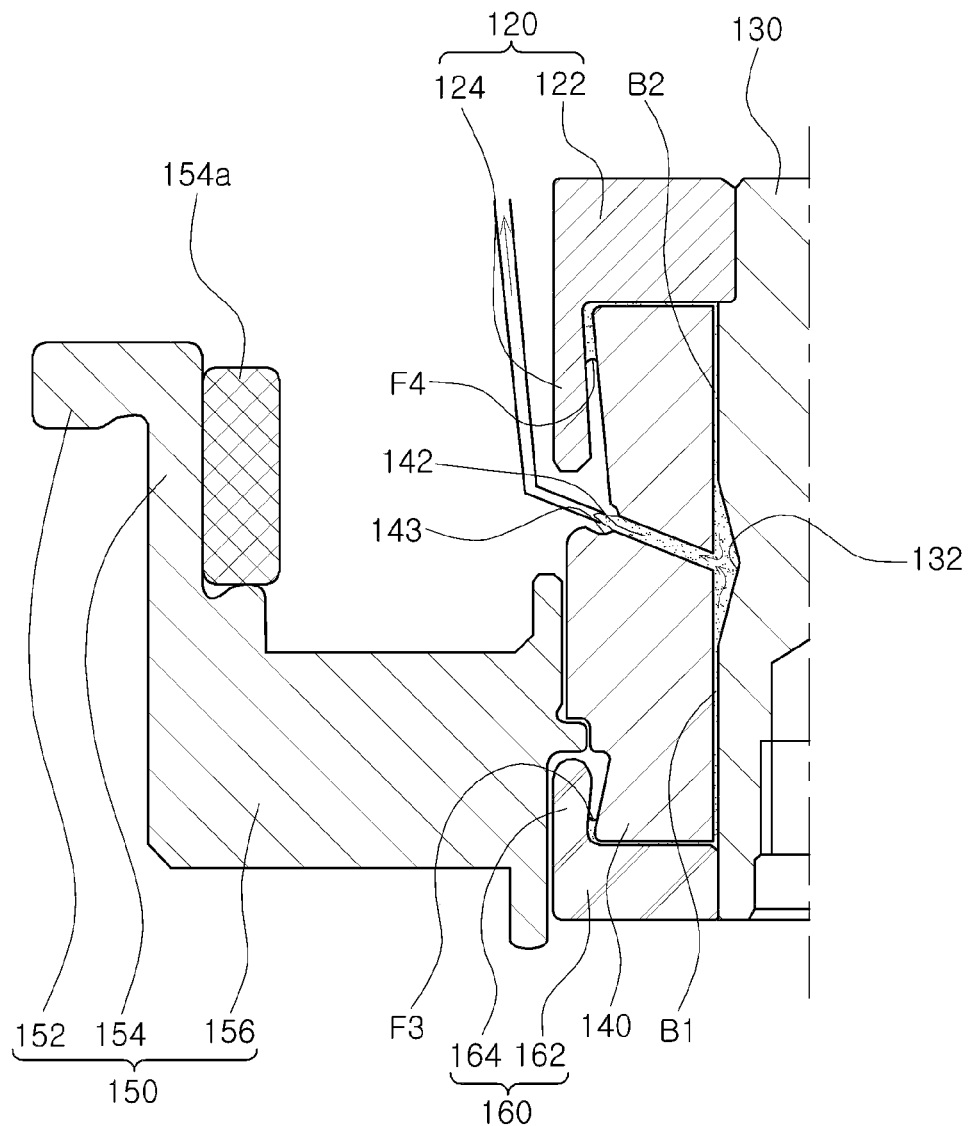

Next, as shown in FIG. 6, the third liquid-vapor interface F3 may be formed in the space between the outer peripheral surface of the sleeve 140 and the inner peripheral surface of the upper thrust member 160, and the fourth liquid-vapor interface F4 may be formed in the space between the outer peripheral surface of the sleeve 140 and the extension part 124 of the lower thrust member 120.

Figure 7:
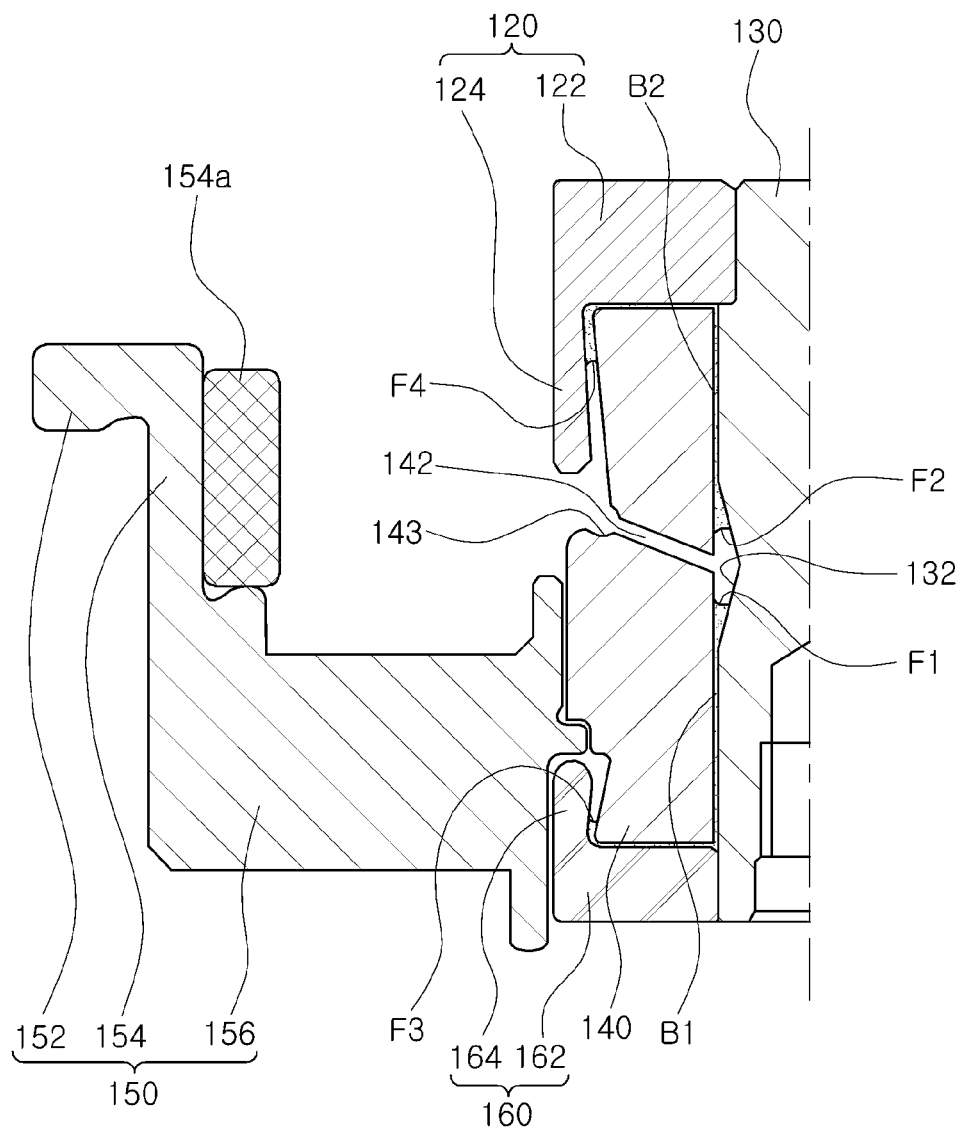

Then, as shown in FIG. 7, the lubricating fluid fully filling the space formed by the depression groove 132 and the sleeve 140 may be sucked through the communication hole 142 formed in the sleeve 140.

Therefore, the first and second liquid-vapor interfaces F1 and F2 may be formed in the space formed by the depression groove 132 and the sleeve 140.

As described above, at the time of the injection of the lubricating fluid, the lubricating fluid may be temporally stored in the fluid storage part 143 in the outer surface of the sleeve 140 and then introduced into the communication hole 142. Therefore, since the operator may perform a process of injecting a lubricating fluid while confirming the process with the naked eye, a fixed quantity of lubricating fluid may be injected.

In addition, since the process of injecting a lubricating fluid may be performed through the fluid storage part 143 and the communication hole 142, the process of injecting a lubricating fluid may be relatively more easily performed.

As set forth above, according to the embodiments of the present invention, the lubricating fluid is temporally stored in the fluid storage part and then injected to the bearing clearance through the communication hole, whereby an injection amount of the lubricating fluid may be confirmed with the naked eye.

In addition, even in the case in which a fixed quantity or more of lubricating fluid is injected, the lubricating fluid may be discharged through the communication hole, such that a fixed quantity of lubricating fluid may be injected.

Further, the lubricating fluid is injected through the fluid storage part and the communication hole, whereby a process of injecting a lubricating fluid may be conveniently performed.

While the present invention has been shown and described in connection with the embodiments, it will be apparent to those skilled in the art that modifications and variations can be made without departing from the spirit and scope of the invention as defined by the appended claims.

What is claimed is:

1. A spindle motor comprising:
   a shaft fixedly connected directly or indirectly to a base member and having a depression groove formed in a central portion of an outer peripheral surface thereof;
   a sleeve rotatably installed on the shaft and having a communication hole formed so as to be connected to the depression groove;
   a rotor hub fixedly installed on the sleeve to thereby rotate together therewith;
   a lower thrust member installed on the base member and mounted on a lower end portion of the shaft; and
   an upper thrust member fixedly installed on an upper end portion of the shaft,
   wherein the communication hole is inclined so that lubricating fluid is easily injected into the depression groove,
   the sleeve includes a fluid storage part formed on an outer peripheral surface thereof, the fluid storage part being connected to the communication hole and temporarily storing the lubricating fluid therein, and
   the rotor hub includes
      a rotor hub body including an insertion part formed therein, the insertion part having the upper thrust member insertedly disposed in an inner portion thereof;
      a mounting part extended from an edge of the rotor hub body and having a driving magnet mounted on an inner surface thereof; and
      a disk seating part extended from an edge of the mounting part in an outer diameter direction.

2. The spindle motor of claim 1, wherein the fluid storage part is formed on the outer peripheral surface of the sleeve in a circumferential direction.

3. The spindle motor of claim 1, wherein in spaces formed by the depression groove and an inner peripheral surface of the sleeve, first and second liquid-vapor interfaces are formed by the lubricating fluid separately filling upper and lower portions thereof and air.

4. The spindle motor of claim 1, wherein the sleeve has an inclination part tapered in a downward axial direction so as to form a liquid-vapor interface together with the upper thrust member, the inclination part having an outer diameter larger in an upper portion thereof than that in a lower portion thereof.

5. The spindle motor of claim 1, wherein the shaft and the sleeve are disposed to be spaced apart from each other by a predetermined interval to thereby form a bearing clearance, the bearing clearance including an upper bearing clearance and a lower bearing clearance, based on the depression groove.

* * * * *